United States Patent
Hirao et al.

(10) Patent No.: US 8,133,317 B2
(45) Date of Patent: Mar. 13, 2012

(54) CEMENT ADDITIVE AND CEMENT COMPOSITION

(75) Inventors: Hiroshi Hirao, Sakura (JP); Kazuo Yamada, Sakura (JP); Kiyoshi Koibuchi, Kawasaki (JP); Nobukazu Nito, Kawasaki (JP)

(73) Assignees: Taiheiyo Cement Corporation, Tokyo (JP); DC Co., Ltd., Kawasaki-shi (JP)

( * ) Notice: Subject to any disclaimer, the term of this patent is extended or adjusted under 35 U.S.C. 154(b) by 939 days.

(21) Appl. No.: 11/990,982

(22) PCT Filed: Oct. 13, 2006

(86) PCT No.: PCT/JP2006/320449
§ 371 (c)(1),
(2), (4) Date: Apr. 3, 2008

(87) PCT Pub. No.: WO2007/046297
PCT Pub. Date: Apr. 26, 2007

(65) Prior Publication Data
US 2009/0151604 A1    Jun. 18, 2009

(30) Foreign Application Priority Data
Oct. 17, 2005   (JP) .................................. 2005-301301

(51) Int. Cl.
*C04B 14/28* (2006.01)
*C04B 18/06* (2006.01)

(52) U.S. Cl. ........ 106/705; 106/715; 106/738; 106/772; 106/789; 106/790; 106/DIG. 1

(58) Field of Classification Search ................... 106/705, 106/DIG. 1, 789, 790, 715, 738, 772
See application file for complete search history.

(56) References Cited

U.S. PATENT DOCUMENTS

| | | | | |
|---|---|---|---|---|
| 3,856,540 | A * | 12/1974 | Mizunuma et al. | 106/705 |
| 4,992,102 | A * | 2/1991 | Barbour | 106/645 |
| 7,048,784 | B2 | 5/2006 | Terasaki et al. | |
| 7,396,402 | B2 * | 7/2008 | Naji et al. | 106/705 |
| 7,419,544 | B2 * | 9/2008 | Naji et al. | 106/705 |
| 7,708,826 | B2 * | 5/2010 | Naji et al. | 106/705 |
| 2002/0189500 | A1 * | 12/2002 | Naji et al. | 106/705 |
| 2003/0233962 | A1 * | 12/2003 | Dongell | 106/709 |
| 2005/0005823 | A1 * | 1/2005 | Gourley et al. | 106/819 |
| 2005/0045067 | A1 * | 3/2005 | Naji et al. | 106/705 |

(Continued)

FOREIGN PATENT DOCUMENTS

JP    A-61-97154    5/1986

(Continued)

OTHER PUBLICATIONS

Office Action mailed Nov. 26, 2008 issued in corresponding JP patent application 2007-540946.

(Continued)

*Primary Examiner* — Paul Marcantoni
(74) *Attorney, Agent, or Firm* — Posz Law Group, PLC (57) ABSTRACT

A cement additive contains industrial waste and has the effect of inhibiting formation of monosulfate in a hardened cementitious material. The cement additive contains specifically calcium carbonate, gypsum and coal ash and/or blast-furnace slag powder. This enables efficient use of industrial waste, allows inhibiting monosulfate formation in the hardened cementitious material, and allows producing a hardened cementitious material having good durability (sulfate resistance).

12 Claims, 3 Drawing Sheets

U.S. PATENT DOCUMENTS

| | | | |
|---|---|---|---|
| 2006/0201395 A1* | 9/2006 | Barger et al. | 106/705 |
| 2008/0302277 A1* | 12/2008 | Naji et al. | 106/692 |

FOREIGN PATENT DOCUMENTS

| | | |
|---|---|---|
| JP | 04-21554 A | 1/1992 |
| JP | 05-116996 A | 5/1993 |
| JP | 07-53245 A | 2/1995 |
| JP | 08-34644 A | 2/1996 |
| JP | A-08-268744 | 10/1996 |
| JP | 09-255327 A | 9/1997 |
| JP | A-2005-272222 | 10/2005 |

OTHER PUBLICATIONS

Office Action mailed Jun. 8, 2007 issued in corresponding JP patent application 2007-540946.

* cited by examiner

CEMENT ADDITIVE AND CEMENT COMPOSITION

TECHNICAL FIELD

The present invention relates to a cement additive using industrial waste as main raw material, and to a cement composition comprising such a cement additive.

BACKGROUND ART

Cement admixtures and the like, in which such waste products are used as raw materials, have been developed in recent years with a view to efficiently using industrial waste and/or ordinary waste. Such conventional cement admixtures may comprise blends of 10 to 100 parts by weight of gypsum (anhydrous basis) and 5 to 50 parts by weight of calcium carbonate relative to 100 parts by weight of blast-furnace slag powder, specifically, blends of blast-furnace slag powder, gypsum and calcium carbonate in blending ratios of 20:7:3, 20:5:5, 17:10:3, 15:10:5, 30:10:5 (weight basis), as described in Patent document 1.
Patent document 1: Japanese Unexamined Patent Application Laid-open No. H05-116996

DISCLOSURE OF THE INVENTION

Problem to be Solved by the Invention

In the hydration reaction of cement, firstly $SO_4^{2-}$ in gypsum reacts with unhydrated $C_3A$ ($3CaO.Al_2O_3$) in the cement, as a result of which there forms ettringite (trisulphate). When the $SO_4^{2-}$ in the liquid phase becomes wholly consumed by that reaction, $CO_2$ derived from calcium carbonate reacts with the unhydrated $C_3A$, as a result of which there forms monocarbonte. If there remains the unhydrated $C_3A$ in the hardened material when all the $CO_2$ has been consumed in the reaction between the $CO_2$ and the unhydrated $C_3A$, the remaining unhydrated $C_3A$ reacts with the ettringite to yield monosulfate.

The inventors found out that such monosulfate gives rise to sulfate expansion in hardened cementitious materials. In a hardened cementitious material using the cement admixture described in Patent document 1, the amount of calcium carbonate in the hardened cementitious material is insufficient, and hence monosulfate forms in the hardened cementitious material. Accordingly, the hardened cementitious material using that cement admixture may give rise to sulfate expansion. The durability of the hardened cementitious material decreases markedly when the hardened cementitious material gives rise to sulfate expansion.

In light of the above, it is an object of the present invention to provide a cement additive, and a cement composition comprising the cement additive, that allows efficient use of industrial waste, and that allows producing a hardened cementitious material having good durability (sulfate resistance), by inhibiting monosulfate formation in the hardened cementitious material.

Means for Solving the Problem

In order to solve the above problems, the present invention provides a cement additive containing industrial waste and having an effect of inhibiting monosulfate formation in a hardened cementitious material (Invention 1).

The above invention (Invention 1) enables efficient use of industrial waste, allows inhibiting monosulfate formation in a hardened cementitious material, and allows achieving good durability (sulfate resistance) in the obtained hardened cementitious material by preventing sulfate expansion in the hardened cementitious material.

Preferably, the cement additive in the above invention (Invention 1) comprises calcium carbonate, gypsum, and coal ash and/or blast-furnace slag powder (Invention 2), or contains coal ash and/or blast-furnace slag powder as the industrial waste; calcium carbonate as the industrial waste and/or calcium carbonate not as the industrial waste; and gypsum as the industrial waste and/or gypsum not as the industrial waste (Invention 3).

Preferably, the cement additive in the above inventions (Inventions 2, 3) comprises the blast-furnace slag powder but not the coal ash, the calcium carbonate is blended in an amount of 6 to 160 parts by weight and the gypsum (anhydrous basis) is blended in an amount of 5 to 150 parts by weight relative to 100 parts by weight of the blast-furnace slag powder, and the content of the calcium carbonate is greater than the content of the gypsum (Invention 4).

In the above invention (Invention 4), the calcium carbonate content is greater than the gypsum content, so that once all the $SO_4^{2-}$ in gypsum has been consumed, unhydrated $C_3A$ remaining in the hardened cementitious material reacts with $CO_2$ derived from the calcium carbonate to yield monocarbonate, which, as a result, allows inhibiting monosulfate formation in the hardened cementitious material. This affords hence good durability (sulfate resistance) and good strength development in the hardened cementitious material.

In the above invention (Invention 4), preferably, the blending ratio (weight basis) of the gypsum and the calcium carbonate is 1:1.1 to 15 (Invention 5). Setting the blending ratio of gypsum and calcium carbonate to be within such range, as in the above invention (Invention 5), allows more effectively inhibiting monosulfate formation in the hardened cementitious material.

In the above inventions (Inventions 2, 3), preferably, the cement additive comprises at least the coal ash, and the calcium carbonate is blended in an amount of 0.5 to 160 parts by weight and the gypsum (anhydrous basis) is blended in an amount of 5 to 150 parts by weight relative to 100 parts by weight of the total of the coal ash and the blast-furnace slag powder (Invention 6).

The $Al_2O_3$ in the coal ash has a lower reaction rate with CaO than the $Al_2O_3$ in the blast-furnace slag powder or the like. Accordingly, the above invention (Invention 6) allows effectively inhibiting monosulfate formation in the hardened cementitious material even when the calcium carbonate content in the cement additive is equal to or smaller than the gypsum content, thus affording good durability (sulfate resistance) and good strength development in the hardened cementitious material. The cement additive of the above invention (Invention 6) may comprise at least coal ash, and may or may not comprise blast-furnace slag powder.

In the above invention (Invention 6), preferably, the blending ratio (weight basis) of the gypsum and the calcium carbonate is 1:0.1 to 15 (Invention 7). When the cement additive comprises at least coal ash, setting the blending ratio of gypsum and calcium carbonate to be within such range, as in the above invention (Invention 7), allows more effectively inhibiting monosulfate formation in the hardened cementitious material.

In the above inventions (Inventions 2 to 7), preferably, the cement additive contains limestone powder as the calcium carbonate (Invention 8).

The present invention provides also a cement composition (Invention 9) comprising the cement additive according to the above inventions (Inventions 1 to 8). Hardening a cement composition of such an invention (Invention 9) allows effectively inhibiting monosulfate formation in the obtained hardened cementitious material, and allows achieving good durability (sulfate resistance) and good strength development in the hardened cementitious material. Such a cement composition allows also inhibiting alkali-aggregate reaction in the obtained hardened cementitious material, and allows achieving a hardened cementitious material having good acid resistance and seawater resistance. Also, a cement composition comprising a cement additive containing at least coal ash allows reducing heat of hydration during hardening of the cement composition.

ADVANTAGEOUS EFFECT OF THE INVENTION

The cement additive of the present invention enables effective use of industrial waste, and allows producing a hardened cementitious material having good durability (sulfate resistance). The cement composition of the present invention allows effectively inhibiting monosulfate formation in a hardened cementitious material obtained by hardening the cement composition, and allows producing a hardened cementitious material having good durability (sulfate resistance).

BEST MODE FOR CARRYING OUT THE INVENTION

The cement additive and the cement composition of the present invention are explained next.

The cement additive of the present invention contains industrial waste and has the effect of inhibiting monosulfate formation in a hardened cementitious material. Preferably, the cement additive contains calcium carbonate, gypsum, and coal ash and/or blast-furnace slag powder. Although coal ash and blast-furnace slag powder are in themselves industrial waste, calcium carbonate and gypsum may each be present as industrial waste or not in the cement additive.

As the calcium carbonate there may be used, for instance, calcium carbonate powder for industrial use, limestone powder and the like, although limestone powder is preferred herein on account of its low cost. Limestone powder is produced by crushing (and if needed, drying and classifying) limestone, which is a natural raw material. As other kinds of calcium carbonate there may also be used crushed dust of shells, coral or the like having calcium carbonate as a main component, or processed products of the foregoing.

Preferably, the Blaine specific surface area of the calcium carbonate is of 2000 to 10000 $cm^2/g$. When the Blaine specific surface area is less than 2000 $cm^2/g$, calcium carbonate has low reactivity, and strength development and durability of the hardened cementitious material may be impaired. When the Blaine specific surface area exceeds 10000 $cm^2/g$, calcium carbonate is difficult to procure, while, in addition, the flow ability and/or workability of the hardened cementitious material may be impaired.

As the gypsum there may be used, for instance, gypsum dihydrate, gypsum hemihydrate, anhydrous gypsum or the like, singly or in arbitrary combinations of two or more. As the gypsum there may be used industrial waste in the form of flue-gas desulfurization gypsum, waste gypsum boards, phosphor gypsum or the like; or gypsum produced naturally.

Preferably, the Blaine specific surface area of gypsum is of 2000 to 8000 $cm^2/g$. When the Blaine specific surface area is less than 2000 $cm^2/g$, gypsum has low reactivity, and strength development and durability of the hardened cementitious material may be impaired. When the Blaine specific surface area exceeds 8000 $cm^2/g$, gypsum is difficult to procure, while, in addition, the flowability and/or workability of the hardened cementitious material may be impaired.

As coal ash there may be used industrial waste such as fly ash, clinker ash or the like. These may be used singly or in arbitrary combinations of two or more.

Preferably, the Blaine specific surface area of coal ash is of 2000 to 7000 $cm^2/g$. When the Blaine specific surface area is less than 2000 $cm^2/g$, coal ash has low reactivity, and strength development and durability of the hardened cementitious material may be impaired. When the Blaine specific surface area exceeds 7000 $cm^2/g$, coal ash is difficult to procure, while, in addition, the flowability and/or workability of the hardened cementitious material may be impaired.

As the blast-furnace slag powder there may be used, for instance, blast-furnace slag powder of water-granulated slag in powder form obtained through water-cooling and crushing of molten blast-furnace slag that is generated as a by-product during the production of pig iron in a blast-furnace, or blast-furnace slag powder of slowly-cooled slag in powder form, obtained by slowly cooling and crushing such molten blast-furnace slag.

Preferably, the Blaine specific surface area of the blast-furnace slag powder is of 3000 to 10000 $cm^2/g$. When the Blaine specific surface area is less than 3000 $cm^2/g$, the blast-furnace slag powder has low reactivity, and strength development and durability of the hardened cementitious material may be impaired. When the Blaine specific surface area exceeds 10000 $cm^2/g$, the blast-furnace slag powder is difficult to procure, while, in addition, the flowability and/or workability of the hardened cementitious material may be impaired.

The cement additive of the present invention may contain either coal ash or blast-furnace slag powder, or may contain both. When the cement additive contains both coal ash and blast-furnace slag powder, the blending ratio thereof (weight basis) is preferably 1:0.1 to 10, in particular 1:0.5 to 4, When the cement additive of the present invention contains blast-furnace slag powder but not coal ash, preferred blending ratios of the various raw materials of the cement additive are, for instance, 6 to 160 parts by weight of calcium carbonate and 5 to 150 parts by weight of gypsum (anhydrous basis) relative to 100 parts by weight of blast-furnace slag powder, such that the calcium carbonate content is greater than that of gypsum. A cement additive having such a composition allows inhibiting monosulfate formation in a hardened cementitious material, preventing sulfate expansion of the hardened cementitious material, and affording a hardened cementitious material having good strength development.

The $Al_2O_3$ content in blast-furnace slag powder, which is an industrial by-product (industrial waste), varies widely. When using blast-furnace slag powder having a high $Al_2O_3$ content as a raw material for the cement additive, therefore, it is preferable to suitably adjust the content amounts, for instance, by increasing the blending ratios of calcium carbonate and gypsum relative to that of the blast-furnace slag powder.

When the content of calcium carbonate is less than the 6 parts by weight, the durability of the hardened cementitious material may be reduced, while when the content exceeds 160 parts by weight, the strength development of the hardened cementitious material may be impaired and the content of blast-furnace slag powder may become excessively small, which may preclude achieving the object of the present invention. The content of calcium carbonate ranges more preferably from 10 to 160 parts by weight, yet more preferably from 15 to 160 parts by weight, and, particularly preferably, from 15 to 60 parts by weight relative to 100 parts by weight of blast-furnace slag powder.

When the content of gypsum is less than 5 parts by weight, not only the initial strength but also the durability of the hardened cementitious material may be reduced, while when the content exceeds 150 parts by weight, strength development may be impaired owing to expansion of the hardened cementitious material, and the content of blast-furnace slag powder may become excessively small, which may preclude achieving the object of the present invention. The content of gypsum ranges more preferably from 10 to 50 parts by weight relative to 100 parts by weight of blast-furnace slag powder.

When the content of calcium carbonate is equal to or smaller than that of gypsum, it may become difficult to inhibit monosulfate formation in the hardened cementitious material, and durability (sulfate resistance) of the hardened cementitious material may be impaired. Preferably, the blending ratio (weight basis) of gypsum to calcium carbonate is of 1:1.1 to 15, in particular 1:1.3 to 10. A blending ratio of gypsum to calcium carbonate within the above ranges allows more effectively inhibiting monosulfate formation in the hardened cementitious material.

When the cement additive of the present invention contains at least coal ash, preferred blending ratios of the various raw materials in the cement additive are 0.5 to 160 parts by weight of calcium carbonate, and 5 to 150 parts by weight of gypsum (anhydrous basis) relative to 100 parts by weight of the total of coal ash and blast-furnace slag powder. The $Al_2O_3$ contained in the coal ash has a lower reaction rate with CaO than the $Al_2O_3$ contained in blast-furnace slag or the like, and hence the monosulfate formation in the hardened cementitious material can be inhibited, and good durability (sulfate resistance) of the hardened cementitious material can be achieved, even when the content of calcium carbonate is equal to or smaller than that of gypsum. Good strength development of the hardened cementitious material can also be achieved as a result.

The $Al_2O_3$ content in coal ash and blast-furnace slag powder, which are industrial byproducts (industrial waste) varies widely. In particular, the composition of coal ash varies considerably depending on carbon type, combustion method and the like. For that reason, when coal ash and blast-furnace slag powder having a high $Al_2O_3$ content are used as raw materials of the cement additive, it is preferable to suitably adjust the content amounts, for instance, by increasing the blending ratios of calcium carbonate and gypsum relative to those of the coal ash and blast-furnace slag powder.

When the content of calcium carbonate is less than 0.5 parts by weight, the durability of the hardened cementitious material may be reduced, while when the content exceeds 160 parts by weight, the strength development of the hardened cementitious material may be impaired and the content of coal ash and/or of blast-furnace slag powder may become excessively small, thus precluding achieving the object of the present invention. The content of calcium carbonate is more preferably of 2.5 to 160 parts by weight, yet more preferably of 5 to 70 parts by weight, and in particular 10 to 60 parts by weight, relative to 100 parts by weight of the total of coal ash and blast-furnace slag powder.

When the content of gypsum is less than 5 parts by weight, not only the initial strength but also the durability of the hardened cementitious material may be reduced, while when the content exceeds 150 parts by weight, strength development may be impaired owing to expansion of the hardened cementitious material, and the content of coal ash and/or of blast-furnace slag powder may become excessively small, thus precluding achieving the object of the present invention. The content of gypsum is more preferably of 5 to 70 parts by weight, and in particular 10 to 50 parts by weight, relative to 100 parts by weight of the total of coal ash and blast-furnace slag powder.

When the cement additive of the present invention contains at least coal ash, the blending ratios (weight basis) of calcium carbonate and gypsum in the cement additive are not particularly limited, but the content of calcium carbonate and the content of gypsum are preferably substantially identical. Preferably, the blending ratio of gypsum to calcium carbonate (weight basis) is of 1:0.1 to 15, more preferably of 1:0.3 to 10, and yet more preferably of 1:0.5 to 5. A blending ratio of gypsum to calcium carbonate within the above ranges allows more effectively inhibiting monosulfate formation in the hardened cementitious material.

Besides calcium carbonate, gypsum, and coal ash and/or blast-furnace slag powder, the above-described cement additive of the present invention may also contain various types of slag such as urban-waste molten slag, steelmaking slag, sewage sludge molten slag and the like, and may contain also various kinds of incineration ash such as urban-waste incineration ash or the like.

The cement additive of the present invention is charged together with cement, aggregate, a water-reducing agent and water in a mixer, and is kneaded in accordance with an ordinary method. The resulting kneaded product is then subjected to water curing and/or steam curing, to yield a hardened cementitious material. Monosulfate formation in the hardened cementitious material thus obtained is inhibited based on the effect of inhibiting monosulfate formation of the cement additive of the present invention, which affords as a result good durability (sulfate resistance) by preventing sulfate expansion.

The cement additive of the present invention may be added to cement to yield a cement composition. No particular limitation is imposed on the cement to which there can be added the cement additive of the present invention, which can be added to any cement. Specific examples of such cement include, for instance, Portland cements such as ordinary Portland cement, high-early strength Portland cement, moderate-heat Portland cement, low-heat Portland cement; blended cements such as blast furnace slag cement, fly ash cement; and cements (eco-cements) comprising gypsum and a pulverized product of a combustion product produced using urban-waste incineration ash and/or sewage sludge incineration ash as raw materials. Using eco-cement as the cement is preferable as it allows increasing waste usage.

Preferably, the content of cement additive (cement proportion) in the cement composition is 90 wt % or less, in particular 5 to 70 wt %. When the content of the cement additive in the cement composition exceeds 90 wt %, the strength development and/or durability of the obtained hardened cementitious material may be impaired. The cement additive of the present invention and a cement composition comprising such a cement additive allow using large amounts of industrial waste.

As described above, the cement additive of the present invention and a cement composition comprising such a cement additive allow improving the sulfate resistance of an obtained hardened cementitious material and inhibiting the alkali-aggregate reaction, and penetration of chloride ions, in the hardened cementitious material. The cement additive of the present invention and a cement composition comprising such a cement additive allow also improving acid resistance in a hardened cementitious material obtained by hardening the cement composition. Also, a cement composition comprising a cement additive containing at least coal ash allows reducing heat of hydration. Inhibition of the alkali-aggregate reaction is believed to be the result of, among other factors, alkali ion fixation and/or structure compacting by the coal ash and blast-furnace slag contained in the cement additive, while inhibition of chloride ion penetration appears to arise, among other factors, from chloride ion fixation and/or structure compacting by the $Al_2O_3$ in the coal ash and blast-furnace slag contained in the cement additive.

EXAMPLES

The present invention is explained in detail next based on examples, although the invention is in no way meant to be limited to or by these examples.

Examples 1 to 4, Comparative example 1

[1] Preparation of a Cement Additive

Cement additives (Examples 1 to 4, Comparative example 1) were prepared by mixing limestone powder (Blaine specific surface area: 5300 $cm^2/g$, calcium carbonate content: 97 wt %), anhydrous gypsum (Blaine specific surface area: 6000 $cm^2/g$), coal ash (Blaine specific surface area: 4500 $cm^2/g$, $Al_2O_3$ content: 20 wt %), and blast-furnace slag powder (Blaine specific surface area: 4800 $cm^2/g$, $Al_2O_3$ content: 15 wt %), in accordance with the blending ratios given in Table 1.

TABLE 1

| | Blending ratios (wt %) | | | | Addition amount in cement (wt %) |
|---|---|---|---|---|---|
| | Limestone powder | Gypsum | Coal ash | Blast-furnace slag | |
| Example 1 | 15 | 10 | — | 75 | 30 |
| Example 2 | 15 | 10 | 40 | 35 | 30 |
| Example 3 | 15 | 10 | 75 | — | 30 |
| Example 4 | 15 | 10 | — | 75 | 40 |
| Comparative example 1 | 10 | 23 | — | 67 | 30 |

[2] Mortar Test

The cement additives of Examples 1 to 4 and Comparative example 1, together with ordinary Portland cement (Taiheiyo Cement Corporation, Blaine specific surface area: 3300 $cm^2/g$) were charged in a mixer and were dry-mixed. The addition amounts (cement proportion) of cement additive in the ordinary Portland cement were as given in Table 1.

Specimens for measurement of compressive strength were then produced in accordance with JIS-RS201, using mixtures of the above cement and cement additives.

(1) The compressive strength of the obtained specimens was measured after being subjected to standard water curing for three months (20° C.). The presence or absence of monosulfate in the specimens after three months of curing was determined by X-ray diffraction.

(2) The obtained specimens were subjected to standard water curing for 7 days (20° C.), and were then cured in a 10% magnesium sulfate aqueous solution up to a 3-month age, after which the compressive strength of the specimens was measured. The cured specimens were also inspected visually. The results are given in Table 2.

TABLE 2

| | 3-month strength (N/$mm^2$) | | Visual inspection results | Monosulfate presence or absence |
|---|---|---|---|---|
| | (1) 3-month water curing | (2) Magnesium sulfate aqueous solution curing | | |
| Example 1 | 79 | 78 | No change | Absence |
| Example 2 | 74 | 73 | No change | Absence |
| Example 3 | 72 | 72 | No change | Absence |
| Example 4 | 77 | 76 | No change | Absence |
| Comparative Example 1 | 74 | 54 | Expasion | Presence |

As Table 2 shows, the hardened cementitious materials using the cement additives of Examples 1 to 4 exhibit good strength development. The table shows also that the hardened cementitious materials exhibit also good sulfate resistance, as they succeeded in developing a strength similar to that of water curing even when cured in an aqueous solution of magnesium sulfate. Moreover, the results of X-ray diffraction showed that the cement additives of Examples 1 to 4 had the effect of inhibiting monosulfate formation in a hardened material, since no monosulfate formed in the hardened cementitious materials.

On the other hand, the hardened cementitious material using the cement additive of Comparative example 1 exhibited low sulfate resistance, since strength dropped upon curing in an aqueous solution of magnesium sulfate. The visual inspection results showed that the hardened cementitious material had expanded (sulfate expansion), while the X-ray results evidenced the monosulfate formation.

Examples 5 to 15, Comparative Examples 2 to 5

[1] Preparation of a Cement Additive

Cement additives (Examples 5 to 15, Comparative examples 2 to 4) were prepared by mixing limestone powder (Blaine specific surface area: 5300 $cm^2/g$, calcium carbonate content: 97 wt %), anhydrous gypsum (Blaine specific surface area: 6000 $cm^2/g$), coal ash (Blaine specific surface area: 4500 $cm^2/g$, $Al_2O_3$ content: 20 wt %), and blast-furnace slag powder (Blaine specific surface area: 4800 $cm^2/g$, $Al_2O_3$ content: 15 wt %), in accordance with the blending ratios given in Table 3.

[2] Preparation of a Cement Composition

The cement additives of Examples 5 to 15 and Comparative examples 2 to 4, together with ordinary Portland cement (Taiheiyo Cement Corporation, Blaine specific surface area: 3300 $cm^2/g$) were charged in a mixer and were dry-mixed. The addition amounts (cement proportion) of the cement additives in the ordinary Portland cement were as given in Table 3. The cement in Comparative example 5 is ordinary Portland cement, having no cement additive added therein.

[3] Sulfate Resistance Test

The 6-month expansion level of Portland cements having added therein the cement additives of Examples 5 to 15 and Comparative examples 2 to 4, and of the ordinary Portland cement of Comparative example 5, were measured in accordance with ASTM-C1012.

The results are given in Table 3.

TABLE 3

| | Blending ratios (wt %) | | | | Addition amount in cement (wt %) | 6-month expansion level (%) |
|---|---|---|---|---|---|---|
| | Coal ash | Blast-furnace slag | Gypsum | Lime-stone powder | | |
| Example 5 | 79.0 | 0.0 | 5.0 | 16.0 | 25.0 | 0.0269 |
| Example 6 | 72.0 | 0.0 | 13.0 | 15.0 | 25.0 | 0.0335 |
| Example 7 | 63.0 | 0.0 | 5.0 | 32.0 | 25.0 | 0.0321 |
| Example 8 | 79.0 | 0.0 | 5.0 | 16.0 | 50.0 | 0.0162 |
| Example 9 | 0.0 | 72.0 | 13.0 | 15.0 | 40.0 | 0.0350 |
| Example 10 | 39.6 | 39.6 | 4.8 | 16.0 | 25.0 | 0.0341 |
| Example 11 | 34.3 | 34.3 | 15.4 | 16.0 | 25.0 | 0.0296 |
| Example 12 | 83.1 | 0.0 | 13.0 | 3.9 | 25.0 | 0.0345 |
| Example 13 | 80.5 | 0.0 | 13.0 | 6.5 | 25.0 | 0.0342 |
| Example 14 | 41.6 | 41.5 | 13.0 | 3.9 | 25.0 | 0.0356 |
| Example 15 | 40.3 | 40.2 | 13.0 | 6.5 | 25.0 | 0.0348 |
| Comparative example 2 | 0.0 | 0.0 | 100.0 | 0.0 | 2.1 | 0.1079 |
| Comparative example 3 | 73.5 | 0.0 | 26.5 | 0.0 | 25.0 | 0.0852 |
| Comparative example 4 | 0.0 | 79.8 | 20.2 | 0.0 | 40.0 | 0.0751 |
| Comparative example 5 | 0.0 | 0.0 | 0.0 | 0.0 | 0.0 | 0.9716 |

As Table 3 shows, the 6-month expansion level of ordinary Portland cements having added therein the cement additives of Examples 5 to 15 was smaller than that of the ordinary Portland cements having added therein the cement additives of Comparative examples 2 to 4, and that of the ordinary Portland cement of Comparative example 5, and exhibited an expansion level that was ½ or less of the 6-month expansion level of the ordinary Portland cements of Comparative examples 2 to 5. This showed that adding to cement the cement additives of Examples 5 to 15 allows improving the durability (sulfate resistance) of a hardened cementitious material.

[4] Compressive Strength Test

A compressive strength test in accordance with JIS-A1108 was carried out on hardened cementitious materials obtained by hardening ordinary Portland cement having added therein the cement additives of Examples 6 and 9, the ordinary Portland cement of Comparative example 5 and moderate-heat Portland cement (Taiheiyo Cement Corporation, Blaine specific surface area: 3200 cm²/g, Comparative example 6). The dimensions of the specimens were ϕ10×20 cm.

The results are given in Table 4.

TABLE 4

| | Compressive strength (MPa) | | |
|---|---|---|---|
| | Age 7 days | Age 28 days | Age 91 days |
| Example 6 | 22.9 | 37.0 | 47.2 |
| Example 9 | 27.4 | 40.6 | 49.0 |
| Comparative example 5 | 28.9 | 37.0 | 44.2 |
| Comparative example 6 | 14.8 | 35.8 | 46.0 |

As Table 4 shows, the hardened cementitious materials obtained by hardening ordinary Portland cement to which the cement additives of Examples 6 and 9 had been added exhibited a compressive strength similar to that of ordinary Portland cement (Comparative example 5) or of moderate-heat Portland cement (Comparative example 6) having no added cement additive. This demonstrates that the hardened cementitious materials obtained by hardening ordinary Portland cement to which the cement additives of Examples 6 and 9 had been added possess excellent strength development.

[5] Autogenous Shrinkage Test

An autogenous shrinkage test was carried out, in accordance with "Autogenous Shrinkage and Autogenous Expansion Test Methods for Cement Paste, Mortar And Concrete (draft)" of the Japan Concrete Institute, on hardened cementitious materials obtained by hardening, respectively, ordinary Portland cement to which the cement additives of Examples 6 and 9 had been added, the ordinary Portland cement of Comparative example 5, and the moderate-heat Portland cement of Comparative example 6. The dimensions of the specimens were 100×100×400 mm.

The results are given in Table 5.

TABLE 5

| | W/B (%) | Replacement ratio (wt %) | Autogenous shrinkage strain ($\times 10^{-6}$) | |
|---|---|---|---|---|
| | | | Age 28 days | Age 91 days |
| Example 6 | 52 | 25 | 7 | −20 |
| Example 9 | | 25 | −38 | −62 |
| Comparative example 5 | | — | −80 | −100 |
| Comparative example 6 | | — | −58 | −70 |

As Table 5 shows, the hardened cementitious materials obtained by hardening ordinary Portland cement to which the cement additives of Examples 6 and 9 had been added succeeded in inhibiting autogenous shrinkage strain, as compared with the ordinary Portland cement of Comparative example 5 and the moderate-heat Portland cement of Comparative example 6.

[6] Adiabatic Temperature Test

An adiabatic temperature test was carried out, in accordance with "Adiabatic Temperature Rise Test Methods (draft)" of the Japan Concrete Institute, on concrete (unit cement amount: 300 kg/m³) produced, respectively, from ordinary Portland cement to which the cement additive of Example 6 had been added, the ordinary Portland cement of Comparative example 5, and the moderate-heat Portland cement of Comparative example 6. The dimensions of the specimens were ϕ40×40 cm, and the measurement initial temperature was 20° C. The testing apparatus used was an air-circulation type testing apparatus.

Figure 1:
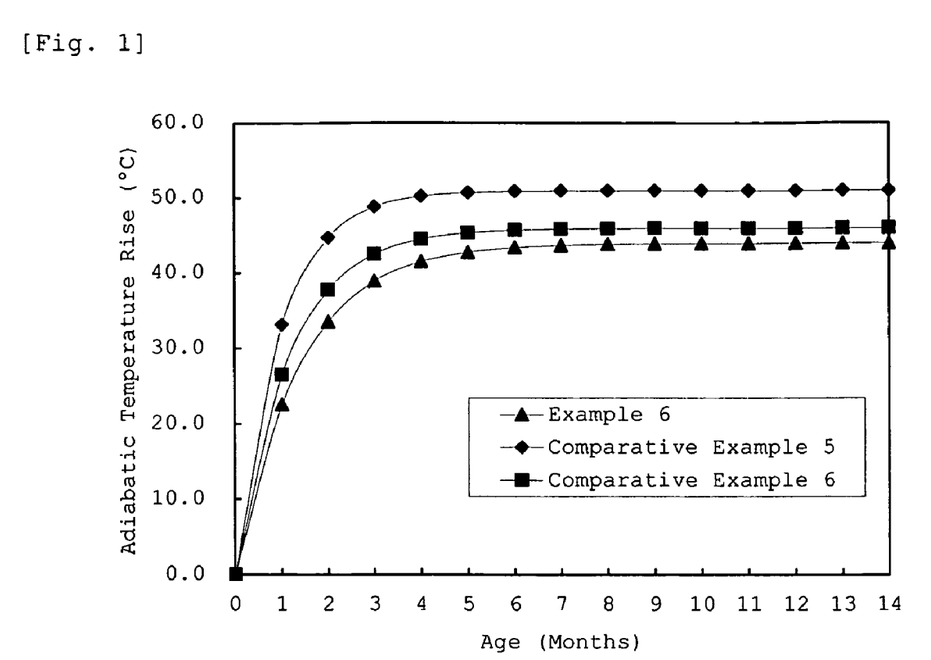
FIG. 1 is a graph illustrating the results of an adiabatic temperature test.

The results are illustrated in FIG. 1.

As illustrated in FIG. 1, the ordinary Portland cement to which the cement additive of Example 6 had been added exhibited an excellent adiabatic temperature characteristic that was superior, in particular, to the adiabatic temperature characteristic of the moderate-heat Portland cement of Comparative example 6. This indicates that the cement additive of Example 6 can reduce the heat of hydration released during hardening of the cement composition.

[7] Alkali-Aggregate Reaction Test

An alkali-aggregate reaction test in accordance with JIS-A1146-2001 (Test method for alkali-silica reactivity of aggregates (mortar bar method)) was carried out on hardened cementitious materials obtained by hardening, respectively, ordinary Portland cement to which the cement additives of Examples 6 and 9 had been added, the ordinary Portland cement of Comparative example 5, and the moderate-heat Portland cement of Comparative example 6. The ages for the specimens tested in the alkali-aggregate reaction test were 1 month, 2 months, 3 months, 4 months, 5 months and 6 months.

Figure 2:
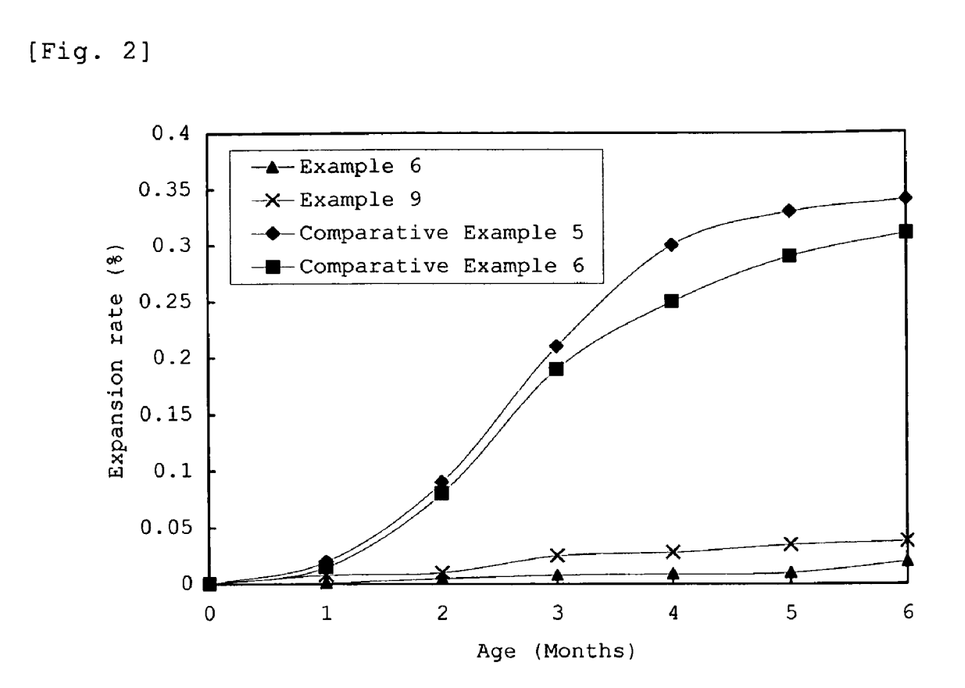
FIG. 2 is a graph illustrating the results of an alkali-aggregate reaction test.

The results are given in Table 6 and illustrated in FIG. 2.

TABLE 6

|  | Expansion rate (%) | | | | | |
| --- | --- | --- | --- | --- | --- | --- |
|  | Age 1 month | Age 2 months | Age 3 months | Age 4 months | Age 5 months | Age 6 months |
| Example 6 | 0.001 | 0.005 | 0.008 | 0.009 | 0.010 | 0.020 |
| Example 9 | 0.008 | 0.010 | 0.025 | 0.028 | 0.035 | 0.038 |
| Comparative example 5 | 0.020 | 0.090 | 0.210 | 0.300 | 0.330 | 0.340 |
| Comparative example 6 | 0.015 | 0.080 | 0.190 | 0.250 | 0.290 | 0.310 |

As table 6 and FIG. 2 show, the hardened cementitious materials obtained by hardening, respectively, the ordinary Portland cement of Comparative example 5 and the moderate-heat Portland cement of Comparative example 6, for which the expansion rate exceeded 0.1% at the age of 3 months, were judged to be damaged. By contrast, the hardened cementitious materials obtained by hardening, respectively, ordinary Portland cement to which the cement additives of Examples 6 and 9 had been added, and which exhibited an expansion rate of less than 0.1%, even for the age of 6 months, were judge to be undamaged. This shows that the cement additives of Examples 6 and 9 were able to inhibit alkali-aggregate reaction in the hardened cementitious materials obtained by hardening cement to which these cement additives are added.

[8] Setting Time Test

A setting time test in accordance with JIS-A1147 was carried out on hardened cementitious materials obtained by hardening cement compositions of, respectively, ordinary Portland cement to which the cement additives of Examples 6 and 9 had been added, the ordinary Portland cement of Comparative example 5, and the moderate-heat Portland cement of Comparative example 6.

The results are given in Table 7.

TABLE 7

|  | Initial setting time | Final setting time |
| --- | --- | --- |
| Example 6 | 5.49 | 8.30 |
| Example 9 | 5.25 | 7.55 |
| Comparative example 5 | 5.57 | 8.03 |
| Comparative example 6 | 5.13 | 7.40 |

As Table 7 shows, the ordinary Portland cement to which the cement additives of Examples 6 and 9 had been added exhibited a setting time similar to the setting time of ordinary Portland cement (Comparative example 5) or of moderate-heat Portland cement (Comparative example 6) having no added cement additive.

[9] Acid Resistance Test

Cement pastes having a water-cement ratio of 40 wt % were prepared using ordinary Portland cement to which the cement additives of Examples 6 and 9 had been added, and the ordinary Portland cement of Comparative example 5. The obtained cement pastes were cast using a φ5×10 cm formwork, were subjected to 1-day moist-air curing at 20° C., were demolded and were subjected to water curing at 20° C. up to an age of 28 days, to prepare solid cylindrical specimens. An epoxy resin was coated on the top and bottom faces of these solid cylindrical specimens, which were then dipped in 5% sulfuric aqueous solution. The resulting erosion depth was determined by measuring the radii of the specimens after a predefined age lapse.

Figure 3:
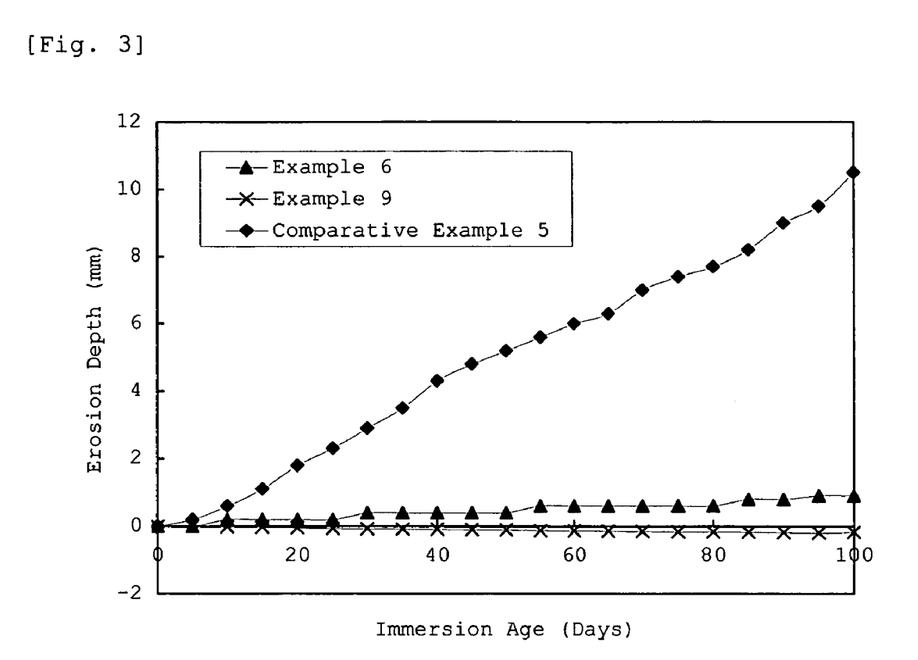
FIG. 3 is a graph illustrating the results of an acid resistance test.

The results are illustrated in FIG. 3.

As illustrated in FIG. 3, the ordinary Portland cement to which the cement additives of Examples 6 and 9 had been added exhibited better acid resistance than the ordinary Portland cement of Comparative example 5.

INDUSTRIAL APPLICABILITY

The cement additive and the cement composition of the present invention are useful for efficient use of industrial waste, and are useful in the production of a hardened cementitious material having good durability (sulfate resistance).

The invention claimed is:

1. A cement additive containing industrial waste and having an effect of inhibiting monosulfate formation in a hardened cementitious material, said cement additive comprising calcium carbonate, gypsum, and blast-furnace slag powder without coal ash,
   wherein said calcium carbonate is blended in an amount of 6 to 160 parts by weight and said gypsum (anhydrous basis) is blended in an amount of 5 to 150 parts by weight relative to 100 parts by weight of said blast-furnace slag powder, and a blending ratio (weight basis) of said gypsum and said calcium carbonate is 1:1.1 to 15.

2. The cement additive according to claim 1, containing blast-furnace slag powder as said industrial waste; calcium carbonate as said industrial waste and/or calcium carbonate not as said industrial waste; and gypsum as said industrial waste and/or gypsum not as said industrial waste.

3. The cement additive according to claim 1, containing limestone powder as said calcium carbonate.

4. A cement composition comprising the cement additive according to claim 1.

5. The cement additive according to claim 2, containing limestone powder as said calcium carbonate.

6. A cement composition comprising the cement additive according to claim 2.

7. A cement additive containing industrial waste and having an effect of inhibiting monosulfate formation in a hardened cementitious material, said cement additive comprising calcium carbonate, gypsum, blast-furnace slag powder and coal ash,
   wherein said calcium carbonate is blended in an amount of 0.5 to 160 parts by weight and said gypsum (anhydrous basis) is blended in an amount of 5 to 150 parts by weight relative to 100 parts by weight of said coal ash and said blast-furnace slag powder, and a blending ratio (weight basis) of said gypsum and said calcium carbonate is 1:0.1 to 15.

8. The cement additive according to claim 7, containing coal ash and/or blast-furnace slag powder as said industrial waste; calcium carbonate as said industrial waste and/or calcium carbonate not as said industrial waste; and gypsum as said industrial waste and/or gypsum not as said industrial waste.

9. The cement additive according to claim 7, containing limestone powder as said calcium carbonate.

10. The cement additive according to claim 8, containing limestone powder as said calcium carbonate.

11. A cement composition comprising the cement additive according to claim 7.

12. A cement composition comprising the cement additive according to claim 8.

* * * * *